United States Patent
Soifer

(10) Patent No.: US 10,556,581 B2
(45) Date of Patent: *Feb. 11, 2020

(54) METHOD FOR VEHICULAR HEATSTROKE PREVENTION

(71) Applicant: Scott Andrew Soifer, Lawrence, NY (US)

(72) Inventor: Scott Andrew Soifer, Lawrence, NY (US)

(73) Assignee: Scott Andrew Soifer, Lawrence, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/791,185

(22) Filed: Oct. 23, 2017

(65) Prior Publication Data

US 2018/0072299 A1 Mar. 15, 2018

Related U.S. Application Data

(63) Continuation of application No. 15/369,531, filed on Dec. 5, 2016, now Pat. No. 9,796,371.

(Continued)

(51) Int. Cl.
*B60W 10/30* (2006.01)
*B60H 1/00* (2006.01)

(52) U.S. Cl.
CPC ......... *B60W 10/30* (2013.01); *B60H 1/00742* (2013.01); *B60H 1/00978* (2013.01); *B60W 2420/00* (2013.01); *B60W 2710/30* (2013.01)

(58) Field of Classification Search
CPC ............. B60W 10/30; B60W 2420/00; B60W 2710/30; B60H 1/00742; B60H 1/00978
(Continued)

(56) References Cited

U.S. PATENT DOCUMENTS

| 4,708,118 A | 11/1987 | Rawlings |
| 5,598,141 A * | 1/1997 | Grasmann ........... B60R 25/1004 340/426.27 |

(Continued)

FOREIGN PATENT DOCUMENTS

| CN | 109501554 A * | 3/2019 | |
| DE | 102004051912 A1 * | 4/2006 | ......... B60H 1/00742 |

(Continued)

OTHER PUBLICATIONS

Garethiya et al. Affordable system for alerting, monitoring and controlling heat stroke inside vehicles. Industrial Instrumentation and Control; 1506-1511, 2015. (https://www.researchgate.net/profile/Giirishchandra_Yendargaye/publication/282270103_Affordable_System_for_Alerting_Monitoring_and_Controlling_Heat_Stroke_inside_Vehicles/links/560a192108ae4d86bb135d9e.pdf).

(Continued)

*Primary Examiner* — Tuan C To
(74) *Attorney, Agent, or Firm* — Pearl Cohen Zedek Latzer Baratz LLP

(57) ABSTRACT

A passive vehicular heatstroke prevention system monitors carbon dioxide ($CO_2$) and infrared (IR) energy levels to determine whether a child is present inside a closed vehicle, and, if so, monitors the temperature in the vehicle and, if the temperature in the vehicle exceeds at least one preset critical value, automatically lowers the temperature in the vehicle and contacts the driver/caregiver and/or emergency personnel. The system detects the presence of a child in the closed vehicle by detecting a critical level of carbon dioxide in the air within the vehicle, while monitoring the interior vehicle temperature and takes corrective action to prevent the temperature from exceeding a preset value, such as by activating the vehicle's air conditioning unit and lowering the vehicle's (Continued)

windows, as well as contacting the driver/caregiver and/or emergency personnel.

20 Claims, 5 Drawing Sheets

Related U.S. Application Data

(60) Provisional application No. 62/262,822, filed on Dec. 3, 2015, provisional application No. 62/300,508, filed on Feb. 26, 2016.

(58) Field of Classification Search
USPC .......................................................... 701/36
See application file for complete search history.

(56) References Cited

U.S. PATENT DOCUMENTS

| | | | |
|---|---|---|---|
| 5,793,291 A * | 8/1998 | Thornton | B60N 2/002 340/425.5 |
| 6,354,332 B1 | 3/2002 | Burkhardt et al. | |
| 6,424,267 B1 * | 7/2002 | Schell | G08B 21/14 340/521 |
| 6,639,512 B1 | 10/2003 | Lee et al. | |
| 6,642,838 B1 | 11/2003 | Barnas et al. | |
| 6,768,420 B2 | 7/2004 | McCarthy et al. | |
| 6,922,147 B1 * | 7/2005 | Viksnins | B60N 2/002 340/573.1 |
| 6,922,622 B2 | 7/2005 | Dulin et al. | |
| 6,930,614 B2 | 8/2005 | Rackham et al. | |
| 7,109,853 B1 * | 9/2006 | Mattson | B60R 99/00 236/94 |
| 7,170,401 B1 * | 1/2007 | Cole | B60N 2/002 340/439 |
| 7,348,880 B2 | 3/2008 | Hules et al. | |
| 7,830,270 B1 | 11/2010 | Philbert | |
| 8,836,491 B2 | 9/2014 | Rao et al. | |
| 9,000,907 B1 | 4/2015 | Rembach et al. | |
| 9,202,316 B1 | 12/2015 | Trudell | |
| 9,227,484 B1 | 1/2016 | Justice et al. | |
| 9,469,176 B2 | 10/2016 | Boyer et al. | |
| 2002/0023451 A1 | 2/2002 | Kuroda et al. | |
| 2003/0158644 A1 * | 8/2003 | Basson | G08B 13/19647 701/49 |
| 2005/0038582 A1 | 2/2005 | Arndt et al. | |
| 2005/0222933 A1 * | 10/2005 | Wesby | G06Q 40/00 705/36 R |
| 2007/0198147 A1 | 8/2007 | Keith et al. | |
| 2008/0053125 A1 | 3/2008 | Satake et al. | |
| 2009/0212955 A1 | 8/2009 | Schoenberg et al. | |
| 2009/0318068 A1 * | 12/2009 | Iida | B60H 1/00742 454/75 |
| 2010/0073158 A1 | 3/2010 | Uesaka et al. | |
| 2010/0141418 A1 * | 6/2010 | Feroldi | B60Q 1/503 340/449 |
| 2011/0046846 A1 * | 2/2011 | Prokhorov | B60H 1/008 701/36 |
| 2012/0116608 A1 * | 5/2012 | Park | B60H 1/00657 701/2 |
| 2012/0304866 A1 | 12/2012 | Barrett | |
| 2013/0049955 A1 * | 2/2013 | Hoover | B60N 2/002 340/539.11 |
| 2013/0194089 A1 * | 8/2013 | Estrada | G08B 21/22 340/457.1 |
| 2013/0201013 A1 * | 8/2013 | Schoenberg | B60R 22/48 340/438 |
| 2015/0066311 A1 * | 3/2015 | Schroeder | B60N 2/002 701/49 |
| 2015/0191073 A1 | 7/2015 | Björkerud et al. | |
| 2016/0127875 A1 * | 5/2016 | Zampini, II | H04W 52/0296 370/311 |
| 2016/0249191 A1 * | 8/2016 | Avrahami | H04L 67/12 |
| 2016/0272112 A1 | 9/2016 | Degrazia et al. | |
| 2016/0369750 A1 | 12/2016 | Jung | |
| 2017/0131261 A1 * | 5/2017 | Biondo | G01N 33/4972 |
| 2017/0136848 A1 * | 5/2017 | Trutnovsky | B60H 1/00864 |
| 2017/0197173 A1 * | 7/2017 | Yamamoto | F02G 5/02 |
| 2017/0211515 A1 | 7/2017 | Dibble et al. | |

FOREIGN PATENT DOCUMENTS

| | | | | |
|---|---|---|---|---|
| EP | 2 299 205 A1 | 3/2011 | | |
| FR | 2 943 001 A1 | 9/2010 | | |
| FR | 2976853 A1 * | 12/2012 | ......... | B60H 1/00742 |
| GB | 2449261 A | 11/2008 | | |
| JP | 04260811 A * | 9/1992 | | |
| JP | 2004245457 A * | 9/2004 | .......... | B60H 1/3225 |
| WO | WO 2004/001695 A1 | 12/2003 | | |

OTHER PUBLICATIONS

Jali et al. "Feasibility study of vehicular heatstroke avoidance system for children." The International Journal of Engineering and Science; vol. 4, iss. 11; 14-18, 2015. (http://eprints.utem.edu.my/15382/1/Published%20THEIJES_Feasibility%20Study%20of%20Vehicular%20Heatstroke%20Avoidance%20Syatem.pdf).
International Search Report of PCT Application No. PCT/US2016/064993, dated Feb. 15, 2017.
National highway Traffic Safety Administration. "Reducing the Potential for Heat Stroke to Children in Parked Motor Vehicles: Evaluation of Reminder Technology". Report No. DOT HS 811 632, dated Jul. 2012.
National highway Traffic Safety Administration. "Functional Assessment of Unattended Child Reminder Systems". Report No. DOT HS 812 187, dated Jul. 2015.
Jinyu et al., "The experimental study of shell and tube gas cooler in trans-critical carbon dioxide heat pump system." Year:2013, vol. 3, pp. 991-994.
Babak et al., "Prediction of heat transfer in the wellbore for liquid carbon dioxide flooding in high temperature formations," Yea: 2011, pp. 1-6.

* cited by examiner

METHOD FOR VEHICULAR HEATSTROKE PREVENTION

CROSS-REFERENCE TO RELATED APPLICATIONS

The present application is a continuation of U.S. patent application Ser. No. 15/369,531, filed Dec. 5, 2016, which claims the benefit of U.S. Provisional Patent Application No. 62/262,822, filed Dec. 3, 2015, and U.S. Provisional Patent Application No. 62/300,508, filed Feb. 26, 2016, each of which is herein incorporated by reference in its entirety.

FIELD OF THE INVENTION

This invention relates generally to a device for preventing infants, young children and animals from dying of heatstroke when left unattended in a closed vehicle on a warm, sunny day. In particular, the invention relates to a passive vehicular heatstroke prevention system which monitors the conditions within a vehicle to determine whether a child or animal is present inside the vehicle, and, if it is determined that one is present in the vehicle, take necessary steps to prevent heatstroke and death.

BACKGROUND OF THE INVENTION

Babies and young children, as well as animals, can die from heatstroke when left unattended in a closed vehicle at high environmental temperatures (this applies equally to any living, breathing being that does not have the ability or cognition to open a vehicle door when it gets too hot). The driver, be it parent, grandparent, family member, friend or caregiver, either may forget that there is a baby asleep in the back seat or may intentionally leave a sleeping baby or dog alone in the back seat to run a "short" errand. Vehicular heatstroke may also occur when a child is playing in a locked, unattended vehicle.

On average, 37 children die each year from heatstroke when left unattended in a closed vehicle (Null, J., "Heatstroke Deaths of Children in Vehicles", Department of Meteorology and Climate Science, San Jose State University, http://noheatstroke.org (Dec. 1, 2016)). Guard and Gallagher reported that heat-related deaths in young children in motor vehicles occur each year, throughout the country, and primarily during the summer months (Guard, A., & Gallagher, S. S., "Heat Related Deaths to Young Children in Parked Cars: an Analysis of 171 Fatalities in the United States, 1995-2002", Injury Prevention. 11, 33-37 (2005)). Further, there have been 700 reported U.S. child vehicular heatstroke deaths during the 19-year time period from 1998 through October, 2016 (Null, 2016). Null also reported that nearly 75% of the deaths were children ages 2 years or less.

The internal temperature of a car can reach dangerous temperatures within minutes, even on a mild sunny day (Nixdorf-Miller, A., Hunsake, D. M., & Hunsaker III, J. C., "Hypothermia and Hyperthermia Medicolegal Investigation of Morbidity and Mortality from Exposure to Environmental Temperature Extremes", Arch Pathol Lab Med. 130, 1297-1304 (2006)). For example, on a warm, sunny day, the greenhouse effect rapidly heats the air inside a closed vehicle to temperatures well in excess of the 104° F. (40° C.) life-threatening, core human-body temperature. At this point, severe hyperthermia resulting in heatstroke occurs, causing the baby or young child to die. Moreover, these preventable deaths have even occurred on days when the temperature was less than 51° F. (Null, 2015).

McLaren, Null and Quinn (2005) described three phases of heat illness (McLaren, C., Null J., & Quinn, J. "Heat Stress form Enclosed Vehicles: Moderate Ambient Temperatures Cause Significant Temperature Rise in Enclosed Vehicles", Pediatrics, 116(1), e109-e112 (2005)). The mildest form is heat stress, which is physical discomfort and physiologic strain. McLaren et al. (2005) next describe heat exhaustion which they define as a "mild to moderate illness associated with dehydration and a core temperature ranging from 37-40° C." (98.6-104° F.). Symptoms of heat exhaustion include: intense thirst, weakness, anxiety, dizziness, fainting and headache (McLaren et al. 2005). The authors describe the third phase as heatstroke. Heatstroke occurs when the core body temperature is greater than 40° C. (104° F.); the child is no longer able to regulate body temperature (Nixdorf-Miller et al., 2006). At this stage, there are changes in the central nervous system, which results in delirium, convulsions, coma, and death (McLaren et al. 2005). In addition, babies and very young children are more at risk for hyperthermia (core body temperature greater than 40° C.) because of their limited thermoregulatory response to excessive heat (Nixdorf-Miller et al., 2006).

Sunlight and the greenhouse effect are responsible for heating the interior of vehicles. When sunlight passes through the windshield and windows of a closed vehicle, the sunlight heats the air and objects (e.g., dashboard, steering wheel, seat cushions, etc.) inside the vehicle (Nave, R., "Greenhouse Effect", Department of Physics and Astronomy, Georgia State University, http://hyperphysics.phy-astr.gsu.eduhbase/thermo/grnhse.html (2015)). These objects, in-turn, radiate heat in all directions in the infrared (IR) portion of the electromagnetic spectrum. IR radiation has difficulty passing through glass and, consequently, is reflected back inside the vehicle causing the temperature in the vehicle to rise further (Nave, 2015). Furthermore, water vapor and $CO_2$ in the air within the car absorbs this IR energy and traps the heat inside the vehicle (UCSB ScienceLine, "Why is the inside of a car hotter than the outdoor temperature on a sunny summer day?", University of California, Santa Barbara, http://scienceline.ucsb.edu/getkey.php?key=3882 (2015). This trapping of IR radiant energy, also known as the greenhouse effect, rapidly heats the air inside the closed vehicle. The interior temperatures may easily surpass the 104° F. life-threatening, core human-body temperature. If there is an unattended child in a closed vehicle, severe hyperthermia resulting in heatstroke occurs and the child dies.

As shown in McLaren et al., 2015, at page 111, the temperature rise due to the greenhouse effect is a nonlinear function of elapsed time, with two-thirds of the rise occurring within the first 20 minutes. Regardless of the original ambient temperature, each car showed a similar rate of increase. Thus, "even at relatively cool ambient temperatures, the temperature rise in vehicles is significant on clear, sunny days and puts infants at risk for hyperthermia" (McLaren et al., 2015). The Stanford University study also observed an 80% temperature increase within the first 30 minutes with maximum internal temperatures at 60 minutes (McLaren et al., 2015). The results of the Stanford group correlates with documentation of heat-related deaths by Null (2015). Documented cases of child heatstroke deaths occurred where the ambient temperature was as low as 51° F. (Null, 2015); two children died in a high altitude sunny climate when the outdoor temperature was merely 35° F. (Null, 2015).

The issue of children dying of heatstroke when left unattended in closed vehicles has captured the attention of the U.S. Department of Transportation's (DOT) National Highway Transportation and Safety Administration (NHTSA). In July 2012, NHTSA published a detailed evaluation of products designed to prevent children up to 3 years of age from being left behind in closed vehicles—a scenario leading to heatstroke (Arbogast, K. B., Belwadi, A., & Allison, M., "Reducing the Potential for Heatstroke to Children in Parked Motor Vehicles: Evaluation of Reminder Technology", Report No. DOT HS 811 632, Washington, D.C.: National Highway Traffic Safety Administration). The 2012 NHTSA study evaluated reminder technology devices and found these devices to be inconsistent and unreliable in performance (Arbogast, Belwadi & Allison).

Since 2012, NHTSA has sponsored annual "Where's Baby? Look Before You Lock" awareness campaigns during warm-weather months to alert parents and others to the dangers of heatstroke (http://www.acfhhs.gov). On Jul. 31, 2015, NHTSA joined Safe Kids Worldwide as part of National Heatstroke Prevention Day to "urge parents and caregivers to take proper precautions to prevent child heatstroke tragedies in hot vehicles (www.nhtsa.gov)."

In addition, NHTSA released a new technical report in July, 2015 providing a functional assessment of both add-on and integrated unattended child reminder systems (Rudd, R., Prasad. A., Weston, D., & Wietholter, K., "Functional Assessment of Unattended Child Reminder Systems", Report No. DOT HS 812 187, Washington, D.C.: National Highway Traffic Safety Administration). The 2015 NHTSA study found these devices to function as expected (Rudd, Prasad, Weston & Wietholter). However, these devices are only effective if they are properly used, installed, and activated by the caregiver. In addition, they require the caregiver to take appropriate action to prevent a tragedy. Meanwhile, every year, children continue to die from vehicular heatstroke, even with educational awareness programs and available reminder systems.

Previous solution attempts to address the problem of leaving an unattended child in a closed vehicle have included: awareness campaigns, sponsored by both government and private sector safety stakeholders, and devices aimed at reminding the driver that a child has been left behind in the vehicle. Thus, prior solution attempts include mainly educational and technological warning solutions.

Educational campaigns have been actively promoting awareness of the dangers of leaving unattended children in vehicles. Unfortunately, they have not been especially effective. Awareness campaigns include the 2012 NHTSA's "Where's Baby? Look Before You Lock" annual campaign (www.acf.hhs.gov) and the 2015 Safe Kids Worldwide "Childhood Injury Prevention Convention (www.safekids.org)." While promoting awareness is important, it is by no means fail-safe. Unfortunately, children continue to die from heatstroke each year. According to research performed by Jan Null (2016) of San Jose State University, the number of U.S. child vehicular heatstroke deaths has not decreased since 2012. In 2011, there were 33 vehicular heatstroke deaths. Since 2012, when education programs were initiated, there has been an average of 34.5 deaths per year. In order to tackle this problem more effectively, additional solutions must be implemented in conjunction with parent or caregiver education.

In recent years, numerous devices have appeared in the marketplace to help remind the driver/caregiver that a child is present in the backseat of the vehicle. These devices differ in the technologies employed. Several approaches have been proposed in recent years to remind the driver that he/she has left a sleeping baby in the vehicle. Examples include (1) a baby seat equipped with a sensor in the seat harness that triggers a series of tones when the ignition is switched off and the baby is still buckled in the seat, (2) a clip that is attached to the strap on the baby seat which senses when the driver leaves the vehicle without the baby and then communicates an alert to an app on the driver's smartphone, and (3) sounding an alarm when the vehicle key fob leaves the proximity of the vehicle. A shortcoming of all of the above approaches is that they are all interactive, requiring action on the part of the driver, and, in the case where the baby is intentionally left so the driver can run a "short" errand, the approaches are completely ineffective. In addition, current available devices cannot help children at play who are trapped inside an unattended vehicle.

In July 2012, NHTSA evaluated 18 devices that would potentially prevent heatstroke in children left unattended in vehicles. This study was done in conjunction with Center for Injury Research and Prevention at the Children's Hospital of Philadelphia, Pa. NHTSA published Reducing the Potential for Heat Stroke to Children in Parked Motor Vehicles: Evaluation of Reminder Technology, thus providing objective systematic evaluation of products available on the market (Arbogast, Belwadi, & Allison).

The 2012 NHTSA study identified and categorized, based on technology, 18 heatstroke prevention devices. Eleven of the 18 devices were commercially available. Of these, only three devices were chosen to be evaluated because they "had technology that sensed the presence of a child in a child restraint (Arbogast, Belwadi, & Allison)." These three devices included: Deluxe Padded Safety Seat Alarm System (or Suddenly Safe Pressure Pad manufactured by Suddenly Safe "N" Secure Systems Inc., Bensalem, Pa.), the ChildMinder Smart Pad (manufactured by Baby Alert International, Dallas, Tex.) and the ChildMinder Smart Clip (manufactured by Baby Alert International, Dallas, Tex.). A comparison of the product features is listed in Table 1.

TABLE 1

Product Features of Unattended Child Reminder Devices (NHTSA 2012)

| Type | Suddenly Safe Pressure Pad | ChildMinder Smart Pad | ChildMinder Smart Clip |
|---|---|---|---|
| Location of Sensor (Sensing Parameter) | Pressure pad in car seat (1 sensor) | Pressure pad in car seat (5 sensors) | Buckled chest clip on harness of car seat |
| Notification Source | Key fob | Key fob | Key fob |
| Activation of System | Active - Driver turns switch to syncing position, holds it adjacent to sensing pad to activate | Active - Base unit beeps when child is seated to indicate driver to synchronize fob to activate system | Active - Safety Clip beeps when buckled to alert driver to activate system and synchronize key fob |

TABLE 1-continued

Product Features of Unattended Child Reminder Devices (NHTSA 2012)

| Type | Suddenly Safe Pressure Pad | ChildMinder Smart Pad | ChildMinder Smart Clip |
| --- | --- | --- | --- |
| Notification Method | Alarm sounds, key fob vibrates | Alarm sounds | Alarm sounds |
| Range | 6 to 50 ft | 15 ft | 15 ft |
| Power Source | Batteries | Batteries | Batteries |
| Vehicle Interface | None | None | None |

The sensing parameter in both the Suddenly Safe Pressure Pad and the ChildMinder Smart Pad is a pressure/force in the child restraint. The sensing parameter in the ChildMinder Smart Clip is a buckled chest clip on the child restraint. Each device was evaluated when the child was first positioned in a parked vehicle. The devices were retested following a 25-minute commute. Both device activation and care giver notification were recorded.

These devices all operated as intended. Each product was designed to identify the presence of a child in an unattended vehicle. Each one required activation at the time the child was placed in the child restraint. The Suddenly Safe Pressure Pad required the driver to activate the system upon placing the child in the car seat. Thus, it was possible to use the car seat without activating the safety features. This problem was avoided with the ChildMinder Smart Pad and the Child-.Minder Smart Clip, as the unit would beep until the key fob was synchronized with the transmitter. All three of these devices are presently on the market.

NHTSA researchers concluded that the tested devices were inconsistent and unreliable in their performance. The children often needed to be repositioned within their child restraints in order for the pressure sensors to detect their presence. In addition, there was difficulty with synchronizing communication between the sensors and the key fobs.

Additional problems with these products include human error from improper installation, and the need to have functioning batteries. The key fob would also need to be present on all sets of keys designated for that vehicle. In addition, placement of the pressure pad in the car seat would need to be adjusted as the child grows in order for the sensors to detect the presence of a child. Caregivers could potentially have a false sense of security.

A major drawback with these devices, however, is they all serve to simply remind the driver that a baby or young child is present in the car, and, as discussed above, such a reminder is ineffective when the driver is aware that a baby or young child is present in the car and does nothing to actually prevent heatstroke from occurring or if the caregiver is unaware that a child is inside the car.

Additional devices to avoid heatstroke mortality in unattended children left in vehicles have become available since the 2012 NHTSA study. In July 2015, NHTSA published "Functional Assessment of Unattended Child Reminder Systems (Rudd, Prasad, Weston & Wietholter)." These car seat systems included both add-on and integrated systems that alert the driver/caregiver to the presence of a child in the vehicle.

The evaluation procedure studied car seat products designed for newborns and children up to the age of three who use harness-based child restraint car seats. Six commercially available car seat products were tested using standardized, anthropomorphic test devices (crash dummies) as surrogates for newborn, 1 and 3 year old children. The six car seat products included: the Aviso Child-in-Car Alert, ChildMinder Elite Pad System, ChildMinder Soft-Clip, Forget Me Not, Suddenly Safe 'N' Secure Wireless Child Protection System, and the True Fit I-Alert C685. A comparison of the product features is listed in Table 2.

TABLE 2

Product Features of Unattended Child Reminder Devices (NHTSA 2015)

| Type | Aviso Child-in-Car Alert | ChildMinder Elite Pad System | ChildMinder SoftClip | Forget Me Not (Sunshine Baby) | Suddenly Safe 'N' Secure Wireless Child Protection System | True Fit I-Alert C685 |
| --- | --- | --- | --- | --- | --- | --- |
| Presence Detection (Sensing Parameter) | Direct (flexible sensing strip) | Direct (pressure pad) | Indirect (buckled chest clip on harness) | Direct (pressure pad) | Direct (pressure pad) | Direct (pressure pad) |
| Notification Source | Vehicle Surroundings | Key fob | Key fob | Smartphone or Key fob | Key fob | Smartphone email |
| Activation of System Automatic Manual (user activation) | Automatic | Manual-Driver presses button on transmitter to synchronize fob and activate system | Manual-Safety Clip beeps when buckled to alert driver to synchronize fob and activate system | Manual-Smartphone: driver activates app Key fob: synchronizes with transmitter | Manual-Driver slides switch on fob to activate system | Automatic-App does not need to be opened for system to work. Car seat contains accelerometer to detect car in motion and |

TABLE 2-continued

Product Features of Unattended Child Reminder Devices (NHTSA 2015)

| Type | Aviso Child-in-Car Alert | ChildMinder Elite Pad System | ChildMinder SoftClip | Forget Me Not (Sunshine Baby) | Suddenly Safe 'N' Secure Wireless Child Protection System | True Fit I-Alert C685 |
| --- | --- | --- | --- | --- | --- | --- |
| Notification Method | Mounted speakers within car and car horn | Alarm sounds, LEDs flash on fob | Alarm sounds, LEDs flash on fob | Smartphone: Message display & audible tone Key fob: audible alarm | Alarm sounds, key fob vibrates | pressure sensor to detect car seat occupied Smartphone: Audible tone, screen message, vibration |
| Power Source | 12 V Car Battery | Batteries | Batteries | Key fob: batteries Smartphone: charged battery | Batteries | Removable Rechargeable Battery |
| Current Availability | Yes | Yes | Yes | Yes | Yes | No |

The Aviso Child-in-Car Alert is an add-on system that interfaces with the vehicle's power and horn. A sensing strip is placed under the car seat fabric cover. This sensing strip flexes under the weight of the child, thus detecting the child's presence. The sensing strip is connected to a control module mounted to the vehicle's interior. The control module includes electrical connections to the vehicle's 12V power and horn. The Aviso requires vehicle-level installation. It is compatible with most types of car seats, but is not compatible with detachable infant carriers. The Aviso notification system is activated as soon as the vehicle power is shut off. If the child is left unattended in the vehicle, a second alert in initiated at a fixed delayed time of 9 minutes and 25 seconds. The car horn will notify bystanders that there is a child in the vehicle. However, dangerous life threatening temperatures can occur earlier than 9.5 minutes. According to McLaren, Null and Quinn (2005), in the journal Pediatrics, the interior vehicular temperature can reach 106° F. within 10 minutes.

The ChildMinder Elite Pad System, Forget Me Not, and Suddenly Safe 'N' Secure Wireless Child Protection System are all add-on systems that rely on a fob for delivering notifications to the user. A pad is placed under the car seat fabric cover in order to detect the weight of a child. The pad is connected to a transmitter module, which is placed on the outer shell of the car seat. The transmitter module and fob use replaceable batteries. These systems do not provide an end-of-trip notification. During testing, NHTSA researchers recorded variability in the ChildMinder Elite Pad System. In addition, the Forget Me Not add-on system has a second version which relies on a user's smartphone for Bluetooth notification delivery. A specialized app must be installed and running on the smartphone. A problem with this system is that the specialized app must be installed and running on the smartphone of all possible drivers or caregivers. In addition, the app must be activated at the time of use. NHTSA found this product to be reliable with reproducible results when tested. However, NHTSA did not take into account realistic issues that involve proper and effective use by the caregiver. These include factors such as the app being installed on each of the individual phones of each caregiver for that child, and the caregiver being in actual possession of his/her phone person with a charged and functioning battery with the phone and Bluetooth turned on. In addition, this device requires the caregiver to take appropriate action in response to the notification, and is not effective for the caregiver who leaves the child intentionally in order to run a quick errand. Furthermore, this system is useless in the case of children who accidently get locked in vehicles during play, when the caregiver is unaware that a child is in the vehicle.

The ChildMinder SoftClip is an add-on system which relies on a fob for notification delivery. A retrofit chest clip replaces the original car seat chest clip of the car seat harness; this chest clip contains a transmitter and closure switch. The chest clip transmitter module and fob both use replaceable batteries. The ChildMinder SoftClip and Elite Pad System remain activated whenever a child is buckled into an infant car seat, even when the infant carrier is not installed in the car seat base within the vehicle.

The True Fit I-Alert C685 is a convertible car seat with an integrated car seat monitor which relies on a user's smartphone for notification delivery. The car seat shell incorporates a control module and two switches that detect the weight of a child. The control module contains a rechargeable battery that must be removed from the car seat for charging. The system relies on a Bluetooth connection with the smartphone. A specialized app must be installed on the smartphone, which will function automatically. However, it would be necessary for all caregivers of this child to install the app on their phones. (The manufacturer is no longer producing this product anymore.)

NHTSA reviewed six different unattended child reminder systems. Overall, these products generally functioned as expected. These products focused on children aged three or younger who could potentially be victims of heatstroke. These systems also rely on the driver/caregiver to respond to the device and return to the vehicle for the child. The majority of systems also require correct installation and positioning of pressure sensors. In addition, these pressure sensor pads must be readjusted as the child continues to grow. Lastly, most of these systems require manual activation in order to be used.

Since the 2015 publication from NHTSA, additional devices have come on the market to prevent children from being unattended in vehicles. Most of these are apps which require smartphones. These include: Kars4kids Safety App, Don't Forget Your Baby App, Baby Reminder (I&E Applications) and Precious Cargo App. A new product using pressure sensor pads in the car seat (Drivers Little Helper App) interacts with a smartphone and is similar to the systems evaluated by NHTSA. The NFC Baby in Car Reminder sticks to the phone cradle in your car and automatically activates the app. Once activated, the app sends you a notification upon removing your phone from the cradle. These apps are subject to the same problems previously described with devices that use smartphones.

In July 2015, Evenflo, a car seat manufacturer, launched a new car seat, the Advanced Embrace DLX with Sensor-Safe with reminder technology built within the child restraint. The chest clip contains a sensor which is connected to a transmitter within the car seat. The "system does not require Bluetooth, cellular or other devices" (www.evenflo.com/SensorSafe). The car seat plugs into the OBD II port. The battery lasts six years and emits a low battery alarm.

Currently, there are many available products on the market to remind caregivers not to leave young children and babies unattended in a vehicle, thereby reducing the potential for heatstroke. All of these devices are reminder systems and rely on proper use, installation and activation by the caregiver. In addition, all these products require timely action and intervention on the part of the driver/caregiver to prevent a tragedy.

Furthermore, reminder devices are completely ineffective in preventing a potential tragedy in situations where the child has intentionally been left in the vehicle so the driver can run a "short" errand, or where the child at play gets locked in a vehicle. There are no available systems that address this problem. In addition, the reminder devices function only for those caregivers who have purchased and installed them. An optimal system would be a passive system installed in all cars manufactured in the future.

There is a need for a Vehicular Heatstroke Prevention System (VHPS), "The Heat-Free Car Life Saver," that would not only identify a child left unattended in a vehicle, but also detect high temperatures that could endanger the child, while having the ability to automatically lower the temperature and alert the caregiver and/or emergency personnel.

Thus, although there are many products available on the market to address heatstroke prevention, they are all reminder systems and rely on proper use, installation, and action on the part of the caregiver. There are no products or devices that prevent severe dehydration, organ failure and death in children left unattended in a vehicle.

It is desirable to have a vehicular heatstroke prevention system which will detect the presence of a child, automatically lower the vehicular cabin temperature, and notify a caregiver and/or emergency personnel.

SUMMARY OF THE INVENTION

According to certain embodiments of the present invention, there is provided a vehicular heatstroke prevention device or system which monitors carbon dioxide ($CO_2$) and/or infrared (IR) energy levels to determine whether a human, such as a child or elderly person, or other living and breathing being, is present inside the vehicle, and, if it is determined that a living and breathing being is present in the vehicle, monitors the temperature in the vehicle and, if the temperature in the vehicle exceeds at least one preset critical value, automatically lowers the temperature in the vehicle and/or opens the vehicle windows, and contacts a caregiver and/or emergency personnel.

As described hereinbelow, the system described herein may be passive, eliminating the need for human intervention. It is designed to detect the presence of a human, such as a child or elderly person, or animal in the vehicle, by detecting a critical level of carbon dioxide in the air within the vehicle, and then by monitoring the interior vehicle temperature and taking corrective action to prevent the temperature from exceeding a preset value. It is not required that the child be in a child restraint system (e.g., car seat) in order to function and, therefore, includes coverage of the "child at play" scenario.

In certain embodiments, the system has a sleep mode in which no detection or monitoring is performed and an awake mode in which detection and monitoring is performed. In some embodiments, when the system herein is installed in a vehicle, the system wakes from a sleep mode each time the vehicle doors are closed and the vehicle engine is off, and searches for the presence of a breathing person or animal, such as a child, using one or more of the system sensors to detect infrared (IR) radiation and carbon dioxide ($CO_2$). If a breathing person or animal, such as a child or pet, is not detected, the system returns to its sleep mode. If a child is detected, the temperature inside the vehicle is monitored. If the temperature rises to a preset value, the system controller activates the vehicle's air conditioning unit and/or lowers the vehicle's windows a small amount (e.g., an inch or a few inches). Once the temperature rises to the preset value, the caregiver and/or emergency personnel will be contacted. When the temperature is lowered to a second preset value, the vehicle's air conditioning unit shuts off, and the windows are raised. This process is repeated until a vehicle door is opened or the engine is turned on. When a door is opened or the engine is turned on, the system returns to its sleep mode.

In certain embodiments, the vehicular heatstroke prevention system comprises a carbon dioxide sensor; an infrared sensor; a temperature sensor; and a processor configured to: detect the presence of a breathing person or animal in a vehicle by monitoring carbon dioxide ($CO_2$) levels in the vehicle via the $CO_2$ sensor and/or infrared (IR) levels in a vehicle via the IR sensor; monitor a temperature (T) inside the vehicle via the temperature sensor; and if T reaches or exceeds a preset value ($T_1$), activate the vehicle's air conditioning unit and/or lower at least one of the vehicle's windows.

In certain embodiments, the processor is configured to receive sensor data from one or more sensors of a group of sensors consisting of the $CO_2$ sensor, the IR sensor, the temperature sensor, a carbon monoxide (CO) sensor, a vehicle door sensor and an engine sensor. In certain embodiments, the processor is configured to evaluate the sensor data. In certain embodiments, system further comprises a memory unit to store the sensor data.

In certain embodiments, the processor is configured to detect the presence of a breathing person or animal when T reaches or exceeds $T_1$. In certain embodiments, the processor is configured to stop monitoring the carbon dioxide ($CO_2$) levels and/or the infrared (IR) levels in the vehicle when the presence of a breathing child or animal is not detected.

In certain embodiments, the processor has a sleep mode in which no detection or monitoring is performed and an awake mode in which detection and monitoring is performed.

In certain embodiments, the processor is configured to detect the presence of a breathing person or animal while simultaneously monitoring the temperature. In certain embodiments, the processor is configured to enter the sleep mode if no child or animal is present.

In certain embodiments, the system further comprises a vehicle door sensor, and the processor is configured to detect when a door of the vehicle is opened or closed via the vehicle door sensor. In certain embodiments, the processor is configured to enter the awake mode when the doors of the vehicle are closed. In certain embodiments, the processor is configured to enter the sleep mode if the presence of a breathing person or animal is not detected.

In certain embodiments, the processor is configured to detect when the engine of the vehicle is turned on. In certain embodiments, the processor is configured to enter the sleep mode if the engine of the vehicle is turned on and configured to enter the awake mode if the engine of the vehicle is turned off.

In certain embodiments, the processor is configured to monitor the temperature inside the vehicle if the processor detects the presence of a breathing person or animal. In certain embodiments, the processor is configured to continue monitoring the temperature if T falls below $T_1$. In certain embodiments, the processor is configured to deactivate the vehicle's air conditioning unit and/or raise the vehicle's windows if T drops below a second preset value ($T_2$), wherein $T_2 < T_1$.

In certain embodiments, $T_1$ is the maximum safe temperature for environmental conditions suitable for a newborn or young child, and may be set at 95° F. or another designated temperature. In certain embodiments, $T_1$ is set at an appropriate temperature to assure that activation of the vehicle's air conditioning system at $T_1$ prevents T from reaching harmful temperatures.

In certain embodiments, the system further comprises a carbon monoxide (CO) sensor, wherein the processor is configured to monitor carbon monoxide (CO) levels in the vehicle via the CO sensor. In certain embodiments, the processor is configured to shut down the engine and/or lower at least one of the vehicle's windows if CO is detected in the vehicle. In certain embodiments, the processor is configured to continue to monitor CO levels when the engine is on, independent of the temperature. In certain embodiments, the processor is configured to contact the caregiver and/or emergency personnel if CO is detected in the vehicle.

In certain embodiments, the processor is configured to, if needed, start the engine of the vehicle prior to activating the vehicle's air conditioning unit and/or lowering at least one of the vehicle's windows.

In certain embodiments, the processor is configured to activate a horn or an alarm of the vehicle or an audible voice recording via a speaker, if the presence of a child is detected and the temperature exceeds a preset value ($T_1$).

In certain embodiments, the system further comprises a communications device, wherein the processor is configured, if T reaches or exceeds $T_1$, to send a communication via the communications device. In certain embodiments, the processor is configured to contact a driver/caregiver and/or emergency personnel via the communications device when $T > T_1$ and the processor detects the presence of a breathing person or animal.

In certain embodiments, the processor is configured to be an add-on to the vehicle, wherein the vehicle has a remote starter system. In certain embodiments, the processor is configured to use an on-board diagnostics (OBD) port to access the electrical system of the vehicle.

BRIEF DESCRIPTION OF THE DRAWINGS

The foregoing and other objects, features, and advantages of the present invention, as well as the invention itself, is more fully understood from the following description of various embodiments, when read together with the accompanying drawings.

Figure 1:
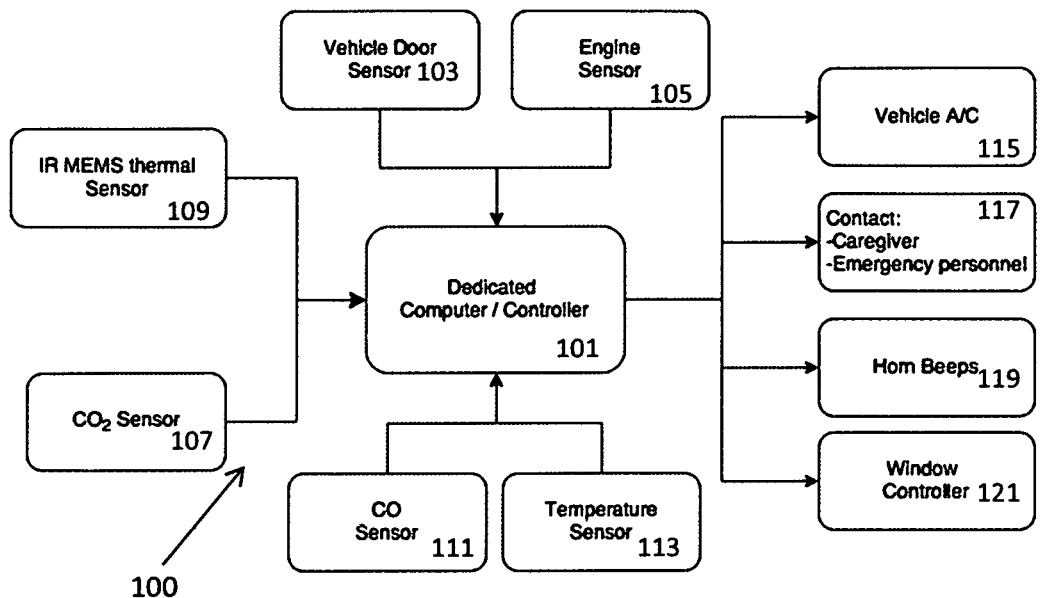
FIG. 1 is a diagram of a vehicular heatstroke prevention system, according to an illustrative embodiment of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it is apparent to one skilled in the art that the present invention may be practiced without the specific details presented herein. Furthermore, well known features may be omitted or simplified in order not to obscure the present invention.

In certain embodiments, the vehicular heatstroke prevention system described herein is passive, eliminating the need for human intervention. It is designed to detect the presence of a breathing person or animal, such as a child or pet, in the vehicle, monitor the interior vehicle temperature, and take corrective action to prevent the temperature from exceeding a preset value. Although reference is made in the discussion herein to a child in the vehicle, it should be understood that the discussion is also applicable to any breathing adult, pet or animal.

In certain embodiments, the system is able to detect the presence of a child, whether awake or asleep, whether moving or stationary; monitor the temperature inside the vehicle; if necessary, start the vehicle's engine, and turn on/off the vehicle's air conditioning unit; lower/raise vehicle's windows; detect when a vehicle door has been opened or closed; detect when the vehicle's engine has been turned on/off; receive, store and evaluate sensor data; and control and communicate with sensors and selected vehicle systems.

In certain embodiments, if deemed desirable, system functions could be included to announce the occurrence of an "event" via a variety of notification methods.

In certain embodiments, the system may also be able to play an audible voice recording either to the outside of the vehicle or to the vehicle's driver via the key fob or a smartphone app; activate the vehicle's horn/alarm; send an alert to smartphone(s); and notify emergency personnel and provide GPS coordinates.

In certain embodiments, the present invention may use sensors to detect carbon dioxide ($CO_2$) and/or infrared (IR) radiation in order to determine the presence of a child in a vehicle.

According to UCSB ScienceLine (2015), every object emits energy at a wavelength dependent upon the temperature of the object; people emit radiation in the infrared (IR) part of the electromagnetic spectrum. In certain embodiments, IR sensors may be used to detect radiation.

Typical passive IR sensors require movement and would not be applicable for detecting a child who is stationary or asleep. The passive IR sensor works by detecting temperature variations between human body surfaces and the surrounding environment (see Aiman Kiwan, "FAQ: The infrared motion sensor." Oct. 28, 2013, available at https://www.ecnmag.com/article/2013/10/faq-infarared-motion-sensor). Passive IR sensors detect motion as a person or object moves in space. Passive IR sensors may function poorly in summer months (or in a closed vehicle in the sun) as there would be a smaller heat gradient between body temperature and ambient temperature (Kiwan, 2013). Because Passive IR sensors cannot sense motionless people, it would not be a good choice for the present system. However, fortunately, there are newer products available, which avoid these pitfalls.

In May 2013, OMRON Corporation, in collaboration with Japan's New Energy and Industrial Technology Development Organization, developed microelectromechanical (MEMS) thermal sensors ("OMRON Develops the World's First 16×16 Element MEMS Non-Contact Thermal Sensor for Use in Human Presence Sensors Utilizing Wafer-Level Vacuum Packaging Technology", May 29, 2013, available at http://www.omron.com/media/press/2013/05/e0529.html, 2013). Omron vacuum sealed the thermopiles within the chip, allowing the sensors to detect "greater temperature differences across metal contacts, thus increasing sensitivity (www.omrom.com, 2013). These IR sensors (e.g., OMRON D6T series, see "D6T MEMS Thermal Sensors: High Sensitivity Enables Detection of Stationary Human Presence", https://www.omron.com/ecb/products/sensor/11/d6t.html, 2015) are able to detect a stationary human presence and would, therefore, be able to detect an infant or child sleeping in its car seat.

The detection of carbon dioxide levels is based upon respiratory physiology. Inhaled air is known to contain 0.039% $CO_2$, while exhaled air contains 4.0% $CO_2$ (see Chapter 1: "The Air We Breathe", http://www.mnstate.edu/marasing/CHEM/102/Chapter%20Notes/CH_01%20ho.pdf). If a breathing person or animal is present in a vehicle, then the detected amount of $CO_2$ in the closed vehicle will increase with each breath. In certain embodiments, $CO_2$ sensors, which detect carbon dioxide concentrations in the air, may be adjusted to sense when the concentration of $CO_2$ in ambient air reaches a particular level, which indicates that a live breathing person, such as a child, or animal, such as a dog, is within the vehicle.

There are a variety of $CO_2$ sensors in the marketplace based on different sensing technologies (e.g., electrochemical, IR and metal oxide). A University of Texas study (Cao et al., "An Infant Monitoring System Using $CO_2$ Sensors", 2007 IEEE RFID Conference, Mar. 26-28, 2007, http://www.uta.edu/faculty/jcchiao/paper_download2/2007_RFID_Hung.pdf) evaluated these different types of $CO_2$ sensors in studying $CO_2$ infant monitoring systems to reduce Sudden Infant Death Syndrome. This study documented that $CO_2$ monitoring technology is able to detect small changes in concentrations of $CO_2$ during infant respiration. In certain preferred embodiments of the system, an infrared $CO_2$ sensor may be used.

Certain current sensor technologies are able to objectively detect and measure both IR radiation and $CO_2$ levels.

In certain preferred embodiments, the temperature inside the vehicle is monitored using a digital temperature sensor and/or by integrating the system's sensor with the vehicle's own interior temperature sensor. For example, the programmable digital thermometer, DS18B20, may be used because of its compatibility with the Arduino microcontroller or Raspberry Pi, or other type of microcontroller/microcomputer or similar device, and the fact that it has zero standby power and does not require an external power source (www-.maximintegrated.com, 2015).

In certain preferred embodiments, the system may also monitor levels of carbon monoxide and take steps to remedy a dangerous situation, such as turn on the vehicle air conditioning, lower the vehicle window, and/or turn off the vehicle engine, if it is on.

In certain preferred embodiments, a dedicated computer with a processor and software will receive, store and evaluate sensor data. An integrated processor/controller (microcontroller/microcomputer or similar device) will communicate with and control the sensors and the vehicle's systems (e.g., engine, air conditioner unit, windows, doors, etc.). An essential part of this functionality requires acceptance by and cooperation of auto manufacturers to participate as stakeholders.

In certain embodiments, the system has a sleep mode in which no detection or monitoring is performed and an awake mode in which detection and monitoring is performed. In certain embodiments, when the system herein is installed in a vehicle, the system wakes from a sleep mode when the engine is off, the vehicle doors are closed, and begins to search for the presence of a child. If a child is not detected, the system returns to its sleep mode. If a child is detected, the temperature inside the vehicle is monitored. If the temperature rises to a preset value, the system controller activates the vehicle's air conditioning unit and may lower the vehicle's windows a small amount (e.g., an inch or a few inches). In some embodiments, for example where the system is installed in a vehicle with a belt-driven compressor, the system must first start the vehicle's engine in order to achieve full air conditioner functionality.

Once the temperature rises to a critical threshold, the caregiver and emergency personnel will be contacted. Contacting emergency personnel serves two purposes—first, the welfare of the child is addressed, and second, this would serve as a deterrent for a caregiver intentionally leaving the child unattended in order to run a quick errand.

When the temperature is lowered to a second preset value, the vehicle's air conditioning unit shuts off, and the windows are raised. This process is repeated until a vehicle door is opened or the engine is turned on. When a door is opened or the engine is turned on, the system returns to its sleep mode.

As will be described hereinbelow, the Vehicular Heatstroke Prevention device and system may be provided in several embodiments. One such embodiment is a completely passive system that can be installed by the car manufacturer. Another such embodiment is an add-on system, which can be adapted for any vehicle with an OBD II port (www.obdii.com), such as cars and light trucks manufactured after 1995.

FIG. 1 is a block diagram of a vehicular heatstroke prevention system 100, according to an illustrative embodiment of the invention, illustrating the flow of data into the dedicated system computer/controller and the output commands to activate various vehicle system functions. As shown in FIG. 1, the vehicular heatstroke prevention system 100 can include a dedicated central controller 101, a vehicle door sensor 103, an engine sensor 105, an infrared a carbon dioxide ($CO_2$) sensor 107, (IR) sensor 109, a carbon monoxide (CO) sensor 111, and a temperature sensor 113. Controller 101 may include a processor that is configured to operate in accordance with programmed instructions, and a data storage (e.g., including one or more volatile or non-volatile, fixed or removable, data storage or memory units). Controller 101 may be operatively connected to the vehicle's air conditioning system (a/c) 115, horn 119, and power window controller 121, as well as to a communications device 117, which may be wireless.

The vehicle door sensor 103, the engine sensor 105, the $CO_2$ sensor 107, the infrared (IR) sensor 109, the CO sensor 111, and the temperature sensor 113 can transmit information to the controller 101. The controller 101 can transmit information to the vehicle's air conditioning system (a/c) 115, the communications device 117, the horn 119, and the power window controller 121.

The controller 101 can receive, store and evaluate sensor data. For example, the controller 101 can detect the presence of a child (awake or asleep, moving or stationary) by monitoring the $CO_2$ and/or IR levels via the $CO_2$ sensor 107 and IR sensor 109, respectively. The controller 101 can monitor the temperature inside the vehicle via the temperature sensor 113. The controller 101 can detect when a vehicle door has been opened or closed via the vehicle door sensor 103. The controller 101 can detect when the vehicle engine is turned on via the engine sensor 105.

In certain embodiments, controller 101 has a sleep mode in which no detection or monitoring is performed and an awake mode in which detection and monitoring is performed.

In some embodiments of the invention, the controller 101 can turn on/off the vehicle's air conditioning unit 115 via the window controller 121. In some embodiments of the invention, the controller 101 can lower/raise the vehicle's windows via the window controller 121. Vehicles with a belt-driven compressor require that the engine be started for the a/c to function, and some also require the engine be started for the vehicle's windows to be raised/lowered. In some embodiments of the invention, the controller 101 can start the vehicle's engine and then turn on the vehicle's air conditioning unit 115.

In some embodiments of the invention, the controller 101 can play an audible voice recording, e.g., to the outside of the vehicle, via a suitable sound or speaker system provided on the vehicle. In some embodiments of the invention, the controller can activate the vehicle horn/alarm 119. In some embodiments of the invention, the controller 101 can notify or alert emergency personnel and provide GPS coordinates, via communications device 117, such as by text to a mobile phone or smartphone of the vehicle's driver or a caregiver, by call or text to a 911 operator, by alert to an integrated key fob, or even an app on a smartphone or other electronic device, or any combination thereof.

Figure 2A:
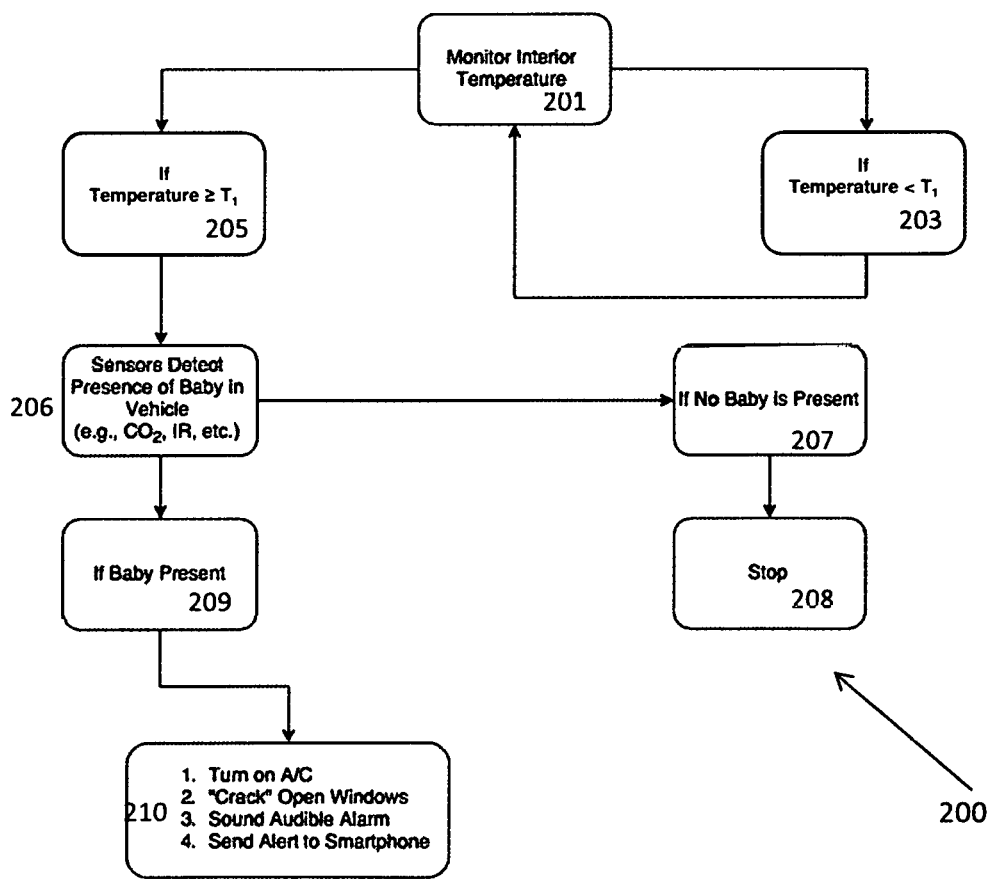
FIG. 2A is a flow diagram illustrating a vehicular heatstroke prevention method, according to an illustrative embodiment of the invention.

FIG. 2A is a flow diagram illustrating a passive vehicular heatstroke prevention method 200, according to an illustrative embodiment of the invention. This method will be described with regard to components of the system 100 as depicted in FIG. 1.

In operation 201, as shown in FIG. 2A, the central controller (e.g., the controller 101) can determine the temperature of the interior of the vehicle via a temperature sensor (e.g., the temperature sensor 113). In operation 203, if the temperature inside the vehicle is less than a preset critical interior vehicle temperature $T_1$, such as 95° F., then the passive vehicular heat stroke prevention system (e.g., the system 100) will continue to monitor the interior vehicle temperature. In some embodiments, the critical interior vehicle temperature $T_1$ can be set at whatever temperature is appropriate to assure timely activation of the vehicle's air conditioning unit such that the air conditioning unit or lowering of windows can prevent the temperature from reaching a temperature that is determined to be dangerous, e.g., 104° F.

In operation 205, if the interior temperature of the vehicle reaches or exceeds the preset critical interior vehicle temperature, 95° F. in the example shown, then the controller can activate $CO_2$ and/or IR sensors, e.g., $CO_2$ and IR sensors 107,109, to determine if a baby is present in the vehicle (operation 206). In operation 207, if, based upon input from $CO_2$ and/or IR sensors, there is no evidence of a baby being present inside the vehicle, the controller can cease the $CO_2$ and IR sampling (operation 208).

In operation 209, if, based upon input from $CO_2$ and IR sensors, the presence of a baby inside the vehicle is detected, then the controller can do one or more of the following: turn on an air conditioner (e.g., the air conditioner 115), crack/open the windows via a window controller (e.g., the window controller 121), sound an audible alarm by beeping a horn (e.g., the horn 119), send an alert as discussed above via a communications device (e.g., the communications device 117), or any combination thereof (operation 210).

In some cases, however, the time between the detection of the critical interior vehicle temperature $T_1$ and the activation of the vehicle's air conditioning system or lowering of windows is too long, even when the critical interior vehicle temperature $T_1$ is set sufficiently low, such that a baby present in the vehicle will suffer damage before the appropriate measures are taken to prevent it. Such a situation can arise, for example, in large vehicles, where the vehicle's interior temperature may reach the critical temperature $T_1$ but the large vehicle cabin size delays the detection of the presence of a child by the $CO_2$ and IR sensors by enough time such that the damage to the child may occur before the vehicle's interior temperature can be sufficiently lowered. Accordingly, it may be advantageous to simultaneously monitor the $CO_2$ levels at the same time as the temperature.

Figure 2B:
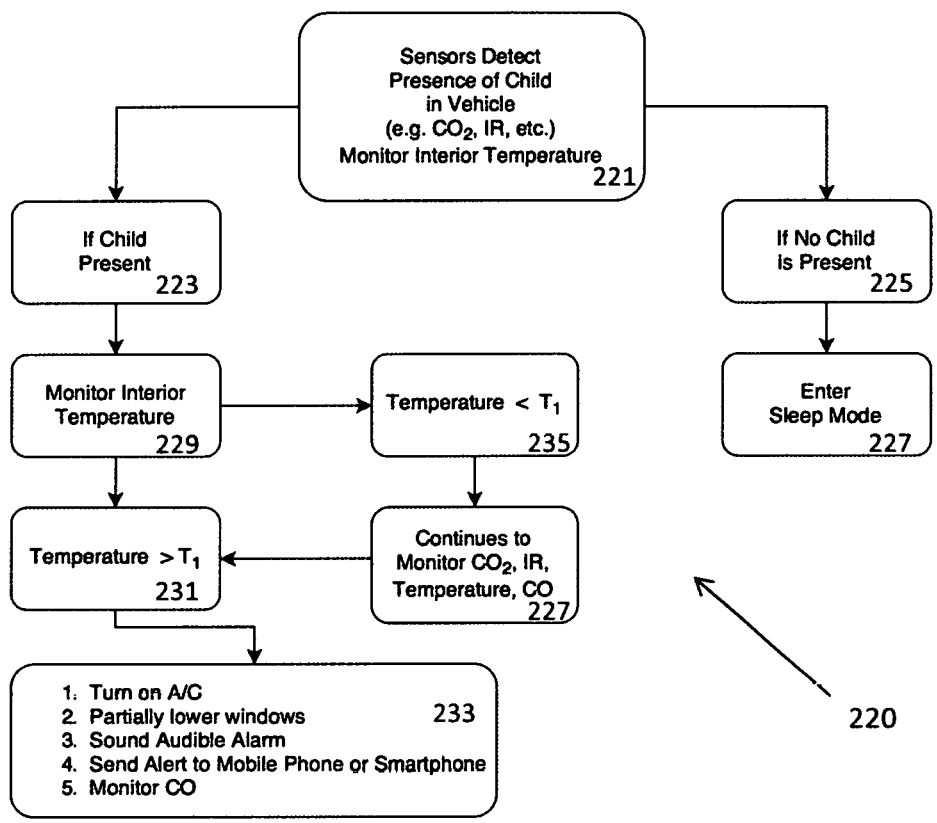
FIG. 2B is a flow diagram illustrating another vehicular heatstroke prevention method, according to an illustrative embodiment of the invention.

FIG. 2B is another flow diagram illustrating a passive vehicular heatstroke prevention method 220, according to an illustrative embodiment of the invention. This method will be described with regard to components of the system 100 as depicted in FIG. 1.

In operation 221, as shown in FIG. 2B, the central controller (e.g., the controller 101) can determine the presence of a baby or young child using information from the $CO_2$ sensors and/or IR sensors (e.g., $CO_2$ and IR sensors 107 and 109, respectively). Simultaneously, the central controller (e.g., the controller 101) will monitor the interior vehicular temperature via a temperature sensor (e.g., the temperature sensor 113). In operation 225, if, based upon input from $CO_2$ and IR sensors, there is no evidence of a baby being present inside the vehicle, the controller can then enter sleep mode (operation 227) and no action is taken.

In operation 223, if, based upon input from $CO_2$ and IR sensors, the presence of a baby inside the vehicle is detected, the controller will continue to monitor the interior temperature of the vehicle (operation 229) via a temperature sensor (e.g., the temperature sensor 113). In operation 235, if the temperature inside the vehicle is less than a preset critical interior vehicle temperature $T_1$, for example 95° F., then the passive vehicular heatstroke prevention system (e.g., the system 100) will continue to monitor the interior vehicle temperature, $CO_2$ and CO (e.g., the carbon monoxide sensor 111) levels (operation 227). In some embodiments, the critical interior vehicle temperature $T_1$ can be set at whatever temperature is appropriate to assure timely activation of the vehicle's air conditioning unit such that the air conditioning unit can intervene prior to reaching a temperature that is determined to be dangerous (e.g., 104° F.).

In operation 231, if the interior temperature of the vehicle reaches or exceeds the preset critical interior vehicle temperature, for example 95° F., and the $CO_2$ sensor detects the presence of a child, the controller (e.g., the controller 101) can do one or more of the following (operation 233): turn on the vehicle air conditioning unit (e.g., the air conditioner 115), crack/open the windows via a window controller (e.g., the window controller 121), sound an audible alarm by beeping a horn (e.g., the horn 119), send an alert as discussed above, via a communications device (e.g., the communications device 117).

Figure 3:
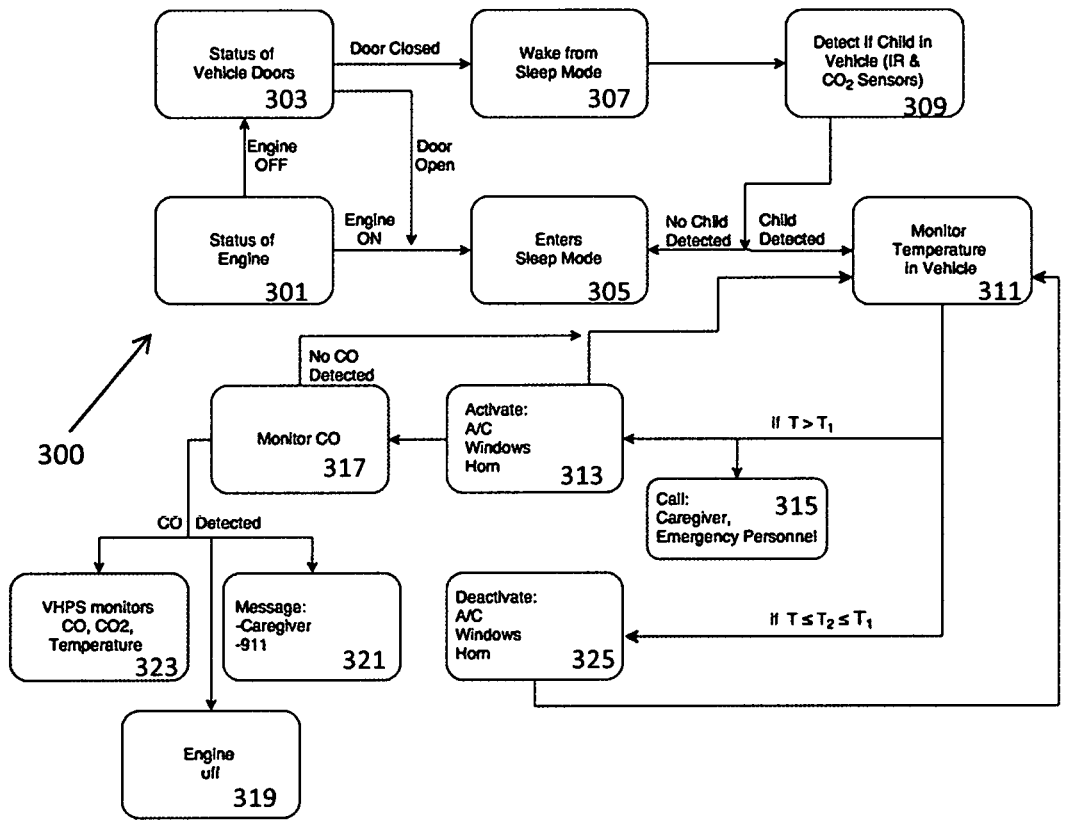
FIG. 3 is a flow diagram illustrating a passive vehicular heatstroke prevention method, according to an illustrative embodiment of the invention.

FIG. 3 is a flow diagram illustrating a passive vehicular heatstroke prevention method 300, according to an illustrative embodiment of the invention. This method will be described with regard to components of the system 100 as depicted in FIG. 1.

In operation 301, as shown in FIG. 3, the vehicular heatstroke prevention system (e.g., system 100) first determines the status of the engine, wherein an engine sensor (e.g., the engine sensor 105) sends a signal to a central controller (e.g., the controller 101). In certain embodiments, controller 101 has a sleep mode in which no detection or monitoring is performed and an awake mode in which detection and monitoring is performed. If the engine is on, system can enter/maintain a sleep mode (operation 305). If the engine is off, the vehicular heatstroke prevention system moves on to operation 303.

In operation 303, once the vehicular heatstroke prevention system determines that the engine is off, the system determines the open/closed status of the vehicle doors, wherein a vehicle door sensor (e.g., the vehicle door sensor 103) sends a signal to the central controller 101. If the vehicle door is open, the system can enter/maintain the sleep mode (operation 305). If the vehicle doors are closed, the system can wake from sleep mode and become activated, i.e., moves from sleep mode to awake mode (operation 307). In some embodiments of the invention, each time the vehicle doors are closed, the vehicular heatstroke prevention system wakes from a sleep mode and begins to search for the presence of a child.

In operation 309, the vehicular heatstroke prevention system checks for the presence of a child in the vehicle. In order to make this determination, the system can use sensors (e.g., the $CO_2$ sensor 107 and the IR sensor 109) to detect carbon dioxide ($CO_2$) and/or infrared (IR) radiation, respectively. If no child is detected, the vehicular heatstroke prevention system can return to the sleep mode (operation 305).

In some embodiments, the IR sensor is an OMRON D6T IR sensor. In some embodiments, the IR sensor is any IR sensor which can function at a temperature $T_1$ and detect the presence of a stationary child. In some embodiments, the temperature $T_1$ can be the maximum safe temperature for environmental conditions suitable for a newborn/young child.

In some embodiments, the system 100 and method 200 utilize an infrared $CO_2$ sensor to detect the presence of a child. In some embodiments, one can determine the required sensitivity of the $CO_2$ sensors to detect various breathing beings, such as a child, in a vehicle for different child age groups and vehicle classes by obtaining interior volumes of different vehicle classes from Department of Transportation (DOT) specifications, and calculate $CO_2$ production rates during respiration in ppm/min for newborns through age 3 (required age to remain in child safety restraint). In some embodiments, the $CO_2$ sensors are chosen based on based the above required sensitivity requirements and function at $T_1$.

If a child is detected, the temperature (T) inside the vehicle can be monitored (operation 311) by a temperature sensor (e.g., the temperature sensor 113) in order to determine if the temperature has exceeded a preset value, $T_1$. If the temperature has not exceeded $T_1$, the temperature sensor can continue to monitor the temperature (T) in a monitoring mode. If $T_1$ has been exceeded, in operation 313, the controller can: activate the vehicle's a/c (e.g., the air conditioner 115), partially open the windows via a window controller (e.g., the window controller 121), sound an audible alarm by beeping a horn (e.g., the horn 119), or any combination thereof. In operation 315, the controller can send an alert as discussed above via a communications device (e.g., the communications device 117).

In operation 317, the controller can monitor the carbon monoxide (CO) levels inside the vehicle, such as by using a carbon monoxide (CO) sensor (e.g., the CO sensor 111). If the CO sensor does not detect a critical level of CO (operation 317), the system will continue to monitor the CO level. If the CO sensor detects CO, the controller can immediately shut down the engine and/or lower the windows (operation 319), or, via a communications device (e.g., the communications device 117), contact emergency personnel and/or a caregiver (operation 321). The system may also continue to monitor $CO_2$, CO, and temperature levels in the vehicle (operation 323). In some embodiments, the CO sensor is any known CO sensor which meets certain sensitivity requirements and functions within appropriate temperature ranges.

When the temperature drops below a second preset level ($T_2$) which is lower than the first preset level ($T_1$), the controller can turn off the a/c and/or the raise the windows (operation 325). The controller can continuously monitor the temperature inside the vehicle and can repeat steps of method 300 as necessary, until a vehicle door is opened or the engine is turned on, or both, at which point the system can enter the sleep mode 305.

In some embodiments of the invention, the temperature $T_1$ is a maximum safe temperature for environmental conditions suitable for a newborn/young child. In some embodiments of the invention, the temperature $T_2$ is a safe temperature which is lower than $T_1$.

In some embodiments of the invention, optional system functions could be included to announce the occurrence of an event via a variety of notification methods.

Figure 4:
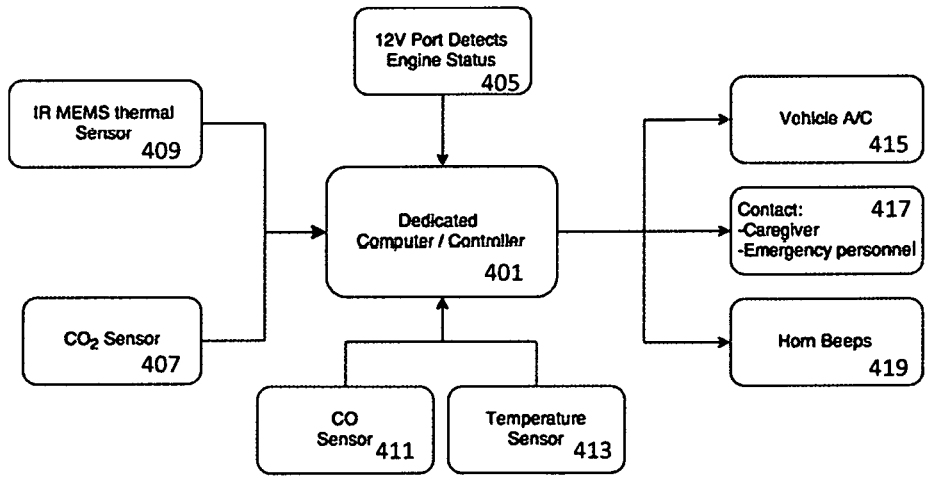
FIG. 4 is a diagram of an add-on vehicular heatstroke prevention system for cars with remote starters, according to an illustrative embodiment of the invention.

FIG. 4 is a diagram of an add-on vehicular heatstroke prevention system 400 for cars with remote starters, according to an illustrative embodiment of the invention.

As shown in FIG. 4, the add-on vehicular heatstroke prevention system 400 can include a dedicated central controller 401, a 12V port 405, a carbon dioxide ($CO_2$) sensor 407, an infrared (IR) sensor 409, a carbon monoxide (CO) sensor 411, and a temperature sensor 413. Controller 401 may include a processor that is configured to operate in accordance with programmed instructions, and a data storage (e.g., including one or more volatile or nonvolatile, fixed or removable, data storage or memory units). Controller 401 may be operatively connected to the vehicle's air conditioning unit (a/c) 415, and horn 419, as well as to communications device 417, whereby the 12V port 405, carbon dioxide ($CO_2$) sensor 407, infrared (IR) sensor 409, carbon monoxide (CO) sensor 411, and temperature sensor 413 can transmit information to the controller 401, and the controller 401 can transmit information to the vehicle's air conditioning unit (a/c) 415, communications device 417, and horn 419.

The add-on vehicular heatstroke prevention system 400 shown in FIG. 4 may differ from the passive vehicular heatstroke prevention system 100 shown in FIG. 1 by not sensing the open/closed status of doors or windows and by not controlling the windows. The add-on vehicular heatstroke prevention system 400 may also be dependent upon the car's remote starter system.

Figure 5:
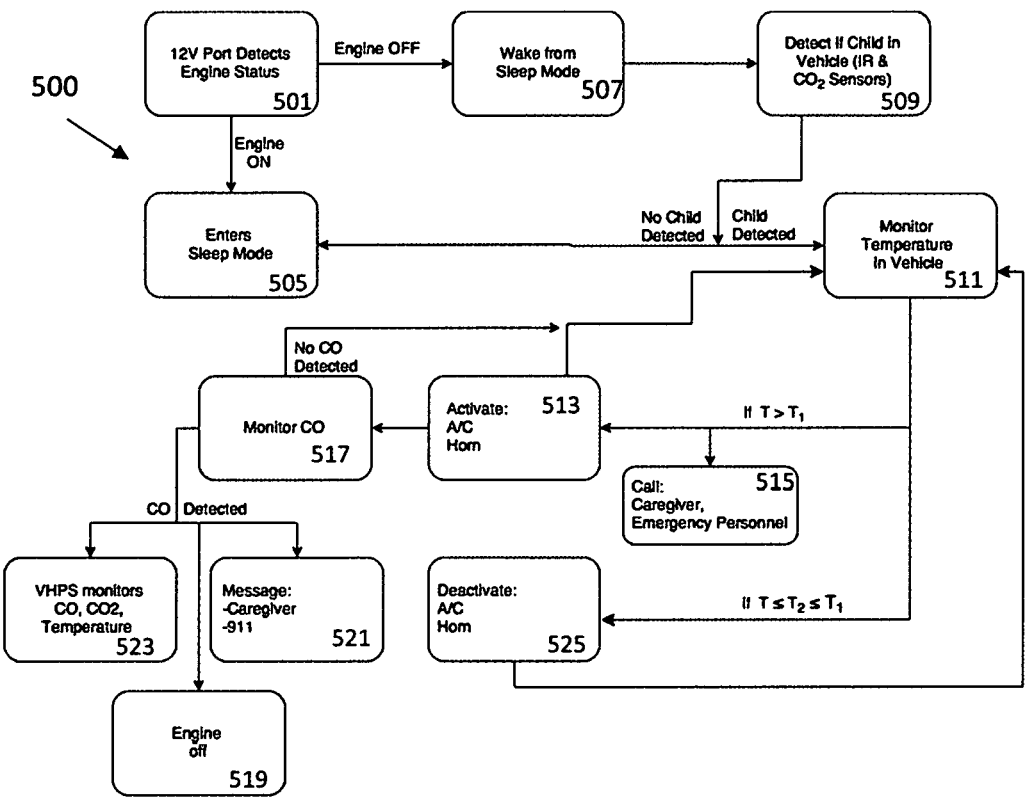
FIG. 5 is a flow diagram illustrating an add-on vehicular heatstroke prevention method, according to an illustrative embodiment of the invention.

FIG. 5 is a flow diagram illustrating an add-on vehicular heatstroke prevention method 500, according to an illustrative embodiment of the invention. This method will be described with regard to components of the system 400 as depicted in FIG. 4.

In operation 501, the vehicular heatstroke prevention system (e.g., the system 400) first checks on the status of the engine, and, in order to make this determination, a 12V port (e.g., the 12V port 405) sends a signal to a central controller (e.g., the controller 401). In certain embodiments, controller 401 has a sleep mode in which no detection or monitoring is performed and an awake mode in which detection and monitoring is performed. If the engine is on, the vehicular heatstroke prevention system can enter/maintain a sleep mode (operation 505). If the engine is off, the system can wake from sleep mode to an active mode in which it becomes activated (operation 507). In some embodiments of the invention, the controller system may be plugged into the 12V port at all times.

In operation 509, the vehicular heatstroke prevention system first checks for the presence of a child in a vehicle, and to make this determination, it can use sensors (e.g., the $CO_2$ sensors 407 and/or the IR sensor 409) to detect carbon dioxide ($CO_2$) and infrared (IR) radiation, respectively. If a child is not detected, the vehicular heatstroke prevention system can return to the sleep mode (operation 505).

If a child is detected, a temperature sensor (e.g., the temperature sensor 413) can monitor the temperature (T) inside the vehicle (operation 511) to determine if it has exceeded a preset value, $T_1$. If the temperature has not exceeded $T_1$, the temperature sensor can continue to monitor the temperature (T) in a monitoring mode. If $T_1$ has been exceeded, in operation 513, the controller can: activate the vehicle's a/c unit (e.g., the air conditioner 415), sound an audible alarm, such as by beeping a horn or alarm via an external speaker (e.g., the horn 419), or any combination thereof. In operation 515, the controller can also send an alert as discussed above via a communications device (e.g., the communications device 417).

In operation 517, the controller can monitor the carbon monoxide (CO) levels inside the vehicle, such as by using a carbon monoxide (CO) sensor (e.g., the CO sensor 411). If the CO sensor does not detect a critical level of CO, the system will continue to monitor CO level. If the CO sensor detects CO, the controller can immediately shut down the engine (operation 519), or, via a communications device (e.g., the communications device 417), contact emergency personnel and/or a caregiver (operation 521). In operation 523, if the CO sensor detects CO, the controller can continue to monitor $CO_2$, CO, and temperature levels in the vehicle.

If the temperature drops below a second preset level ($T_2$) which is lower than the first preset level ($T_1$), the controller can turn off the a/c and/or the raise the windows, and sound the horn or send other notification (operation 525). The controller can continuously monitor the temperature inside the vehicle and can repeat steps of method 500 as necessary, until the engine is turned on, at which point the system can enter the sleep mode 505.

Figure 6:
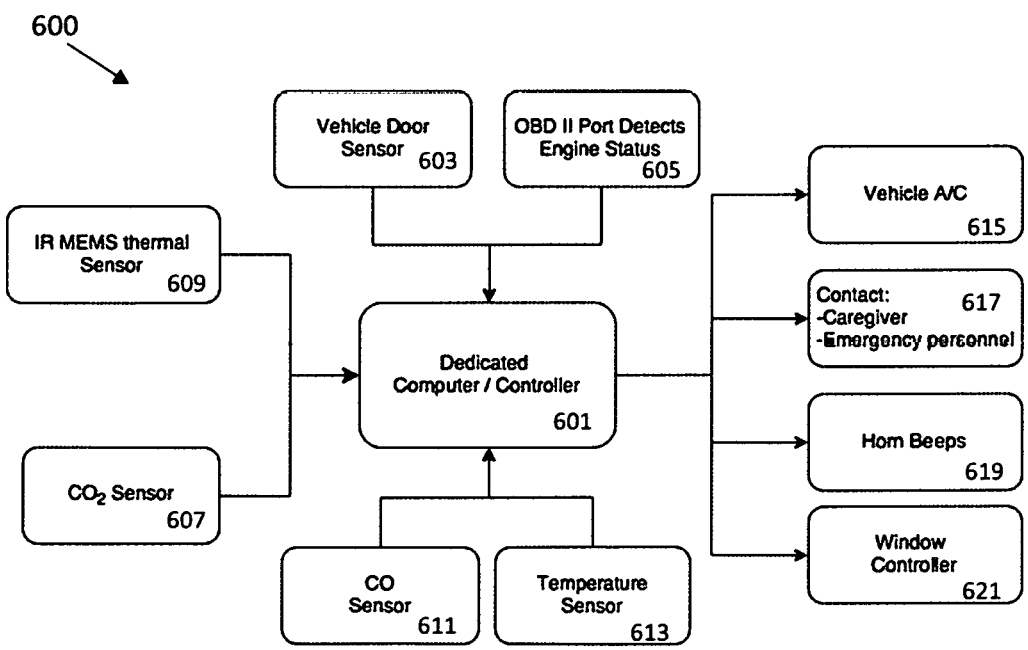
FIG. 6 is a diagram of an add-on vehicular heatstroke prevention system for cars using an OBD II (On-board diagnostics II) port, according to an illustrative embodiment of the invention.

FIG. 6 is a diagram of an add-on vehicular heatstroke prevention system 600 for cars using an OBD II port, according to an illustrative embodiment of the invention.

As shown in FIG. 6, the add-on vehicular heatstroke prevention system 600 can include a dedicated central controller 601, a vehicle door sensor 603, an OBD II port 605, a carbon dioxide ($CO_2$) sensor 607, an infrared (IR) sensor 609, a carbon monoxide (CO) sensor 611, and a temperature sensor 613. Controller 601 may include a processor that is configured to operate in accordance with programmed instructions, and a data storage (e.g., including one or more volatile or nonvolatile, fixed or removable, data storage or memory units). Controller 601 may be operatively connected to the vehicle's air conditioning unit (a/c) 615, horn 619, and power window controller 621, as well as to communications device 617. The vehicle door sensor 603, the OBD II port 605, the $CO_2$ sensor 607, the infrared (IR) sensor 609, the CO sensor 611, and the temperature sensor 613 can transmit information to the controller 601, and the controller 601 can transmit information to the vehicle's air conditioning unit (a/c) 615, the communications device 617, the horn 619, and the power window controller 621.

The add-on vehicular heatstroke prevention system 600 can use the OBD II port 605 to access the electrical system of the car. Use of system 600 may require a simple, one-time installation by attaching the sensor units (e.g., $CO_2$ sensor 607, IR thermal sensor 609, CO sensor 611 and Temperature Sensor 613, which can be provided individually or combined into one sensor unit) of the system 600 and attached anywhere inside of the vehicle, e.g., to the ceiling or elsewhere, and plug in a wireless vehicular heatstroke prevention system 600 into the OBD II port 605.

Figure 7:
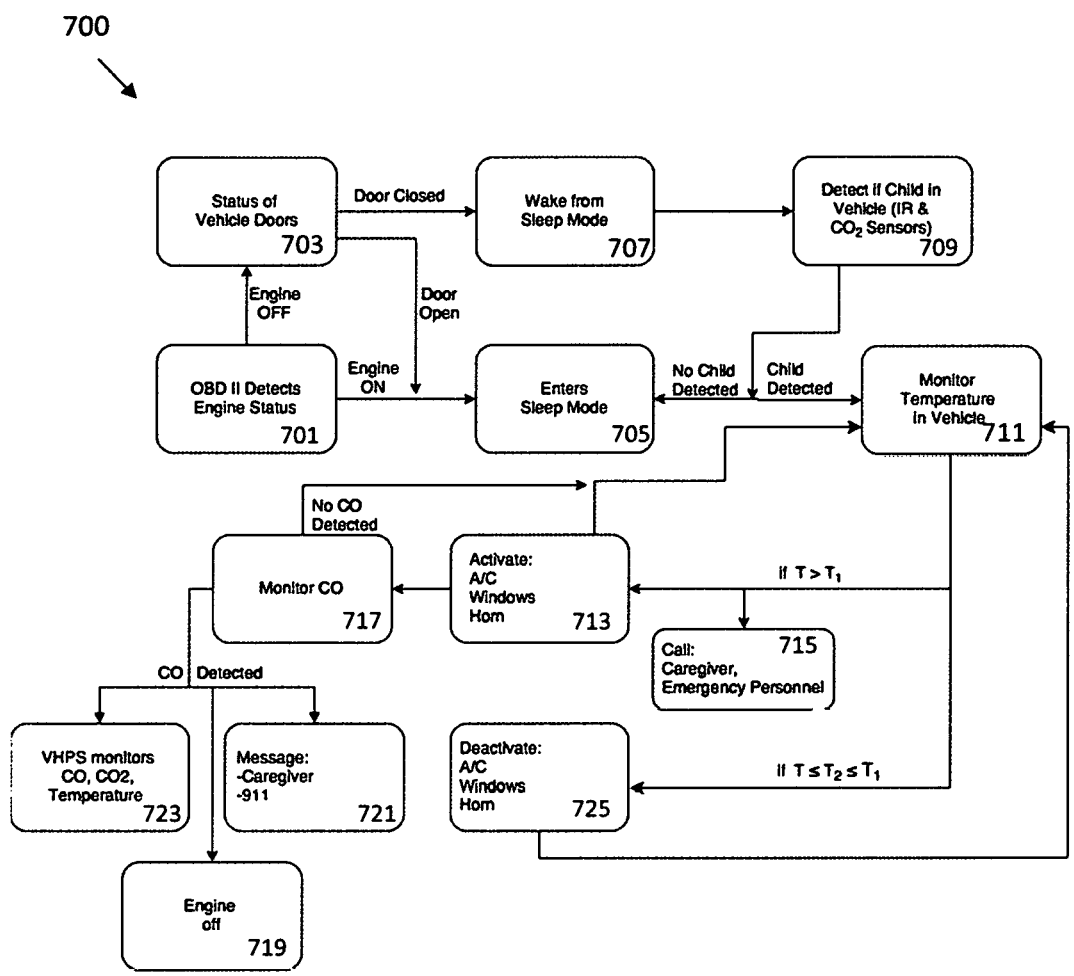
FIG. 7 is a flow diagram illustrating an add-on vehicular heatstroke prevention method for cars using an OBD II port, according to an illustrative embodiment of the invention.

FIG. 7 is a flow diagram illustrating an add-on vehicular heatstroke prevention method 700 for cars using an OBD II port, according to an illustrative embodiment of the invention. This method will be described with regard to components of the system 600 as depicted in FIG. 6.

In operation 701, the vehicular heatstroke prevention system (e.g., the system 600) first checks on the status of the engine, and, in order to make this determination, a OBD II port (e.g., the OBD II port 605) sends a signal to a central controller (e.g., the controller 601). In certain embodiments, controller 601 has a sleep mode in which no detection or monitoring is performed and an awake mode in which detection and monitoring is performed. If the engine is on, the vehicular heatstroke prevention system can enter/maintain a sleep mode (operation 705). If the engine is off, the vehicular heatstroke prevention system moves on to checking the opened/closed status of the vehicle doors (operation 703).

In operation 703, the system checks the opened/closed status of the vehicle doors, and, in order to make this determination, a vehicle door sensor (e.g., the vehicle door sensor 603) sends a signal to the central controller 601. If the vehicle door is open, the vehicular heatstroke prevention system can enter the sleep mode (operation 705). If the vehicle doors are closed, the system can wake from sleep mode and becomes activated (operation 707). In some embodiments of the invention, each time the vehicle doors are closed, the vehicular heatstroke prevention system wakes from a sleep mode and begins to search for the presence of a child.

In operation 709, the vehicular heatstroke prevention system checks for the presence of a child in a vehicle, and to make this determination, it can use sensors (e.g., the $CO_2$ sensor 607 and/or the IR sensor 609) to detect carbon dioxide ($CO_2$) and infrared (IR) radiation, respectively. If a child is not detected, the vehicular heatstroke prevention system can return to the sleep mode (operation 705).

If a child is detected, a temperature sensor (e.g., the temperature sensor 613) can monitor the temperature (T) inside the vehicle (operation 711) to determine if it has exceeded a preset value, $T_1$. If the temperature has not exceeded $T_1$, the temperature sensor can continue to monitor the temperature (T) in a monitoring mode. If $T_1$ has been exceeded, in operation 713, the controller can: activate the vehicle's a/c (e.g., the air conditioner 615), partially open the windows via a window controller (e.g., the window controller 621), sound an audible alarm, such as by beeping a horn or alarm via an external speaker (e.g., the horn 619), or any combination thereof. In operation 715, the controller can also send an alert as discussed above via communications device (e.g., the communications device 617).

In operation 717, the controller can monitor the carbon monoxide (CO) levels inside the vehicle, such as by using a carbon monoxide (CO) sensor (e.g., the CO sensor 611). If the CO sensor does not detect a critical level of CO, the system will continue to monitor CO levels. If the CO sensor detects CO, the controller can immediately shut down the engine (operation 719), and/or lower the windows, or via a communications device (e.g., the communications device 617), contact emergency personnel and/or a caregiver (operation 721). In operation 723, if the CO sensor detects CO, the controller can continue to monitor $CO_2$, CO, and temperature levels in the vehicle. In some embodiments, the CO sensor is any CO sensor which meets certain sensitivity requires and functions within appropriate temperature ranges.

If the temperature drops below a second preset level ($T_2$) which is lower than the first preset level ($T_1$), the controller can turn off the a/c and/or the raise the windows and stop the horn or other notification (operation 725). The controller can continuously monitor the temperature inside the vehicle and can repeat steps of method 700 as necessary, until a vehicle door is opened or the engine is turned on, at which point the system can enter the sleep mode 705.

Thus, a vehicular heatstroke prevention system for preventing infants, young children and animals from dying of heatstroke when left unattended in a closed vehicle on a warm, sunny day has been provided. In addition, the CO safety feature will also prevent CO poisoning and death, even in situations when the system is not needed to lower the temperature of the vehicle.

One skilled in the art will appreciate that the present invention can be practiced by other than the described embodiments, which are presented for purposes of illustration and not limitation. In addition, different embodiments are disclosed herein, and features of certain embodiments may be combined with features of other embodiments, such that certain embodiments maybe combinations of features of multiple embodiments. Further, since numerous modifications and changes will readily occur to those skilled in the art, it is not desired to limit the invention to the exact construction and operation shown and described, and accordingly, all suitable modifications and equivalents may be resorted to, without departing from the scope or spirit of the invention as defined in the appended claims.

The invention claimed is:

1. A method for preventing heatstroke by a living person or animal in a vehicle, the method comprising:
   detecting if an engine of the vehicle is off and, via a vehicle door sensor, if all doors of the vehicle are closed,
   if the doors are closed, monitoring changes in carbon dioxide ($CO_2$) levels in the vehicle via a $CO_2$ sensor to thereby detect the presence of a breathing person or animal in the vehicle;
   after the presence of a breathing person or animal in the vehicle has been detected by the $CO_2$ sensor, monitoring a temperature (T) inside the vehicle via a temperature sensor; and
   if T reaches or exceeds a preset value ($T_1$), activating the vehicle's air conditioning unit and/or lowering at least one of the vehicle's windows.

2. The method according to claim 1, further comprising stopping to monitor changes in the carbon dioxide ($CO_2$) levels in the vehicle when the presence of a breathing person or animal is not detected.

3. The method according to claim 1, further comprising monitoring changes in carbon dioxide ($CO_2$) levels in the vehicle to thereby detect the presence of a breathing person or animal while simultaneously monitoring the temperature (T) inside the vehicle.

4. The method according to claim 3,
   wherein a processor is configured to receive sensor data from one or more sensors of a group of sensors consisting of the $CO_2$ sensor, the temperature sensor, a carbon monoxide (CO) sensor, the vehicle door sensor and an engine sensor, and is configured to perform the steps of claim 1,
   wherein the processor has a sleep mode in which no detection or monitoring is performed and an awake mode in which detection and monitoring is performed, and
   wherein the processor is configured to enter the sleep mode if the presence of a breathing person or animal is not detected.

5. The method according to claim 1,
   wherein a processor is configured to receive sensor data from one or more sensors of a group of sensors consisting of the $CO_2$ sensor, the temperature sensor, a carbon monoxide (CO) sensor, the vehicle door sensor and an engine sensor, and is configured to perform the steps of claim 1, wherein the processor has a sleep mode in which no detection or monitoring is performed and an awake mode in which detection and monitoring is performed, and wherein the processor is configured to enter the awake mode when the doors of the vehicle are detected to be closed.

6. The method according to claim 5, wherein the processor is configured to enter the sleep mode if the presence of a breathing person or animal is not detected.

7. The method according to claim 1, wherein a processor is configured to perform the steps of claim 1, wherein the processor has a sleep mode in which no detection or monitoring is performed and an awake mode in which detection and monitoring is performed, and wherein the processor is configured to enter the sleep mode if the engine of the vehicle is turned on and to enter the awake mode if the engine of the vehicle is turned off.

8. The method according to claim 1, further comprising continuing to monitor the temperature if T falls below $T_1$.

9. The method according to claim 8, further comprising deactivating the vehicle's air conditioning unit and/or raising the vehicle's windows if T drops below a second preset value ($T_2$), wherein $T_2 < T_1$.

10. The method according to claim 1, further comprising monitoring carbon monoxide (CO) levels in the vehicle via a CO sensor.

11. The method according to claim 10, further comprising shutting down the engine and/or lowering at least one of the vehicle's windows if CO is detected in the vehicle.

12. The method according to claim 10, further comprising continuing to monitor CO levels when the engine is on, independent of the temperature.

13. The method according to claim 10, wherein the processor is configured to contact the caregiver and/or emergency personnel if CO is detected in the vehicle.

14. The method according to claim 1, further comprising starting the engine of the vehicle, if needed, prior to activating the vehicle's air conditioning unit and/or lowering at least one of the vehicle's windows.

15. The method according to claim 1, further comprising activating a horn or an alarm of the vehicle or an audible voice recording via a speaker, if the presence of a child is detected and if T exceeds $T_1$.

16. The method according to claim 1, further comprising sending a communication to a driver/caregiver and/or emergency personnel via a communications device, if the presence of a child is detected and if T exceeds $T_1$.

17. The method according to claim 1, wherein $T_1$ is set at 95° F. or another designated temperature.

18. The method according to claim 1, wherein $T_1$ is set at an appropriate temperature to ensure that activation of the vehicle's air conditioning system at $T_1$ prevents T from reaching a third preset value ($T_3$), wherein $T_3 \geq T_1$.

19. The method according to claim 1, wherein $T_1$ is a maximum safe temperature for environmental conditions suitable for a newborn or young child.

20. Software for preventing heatstroke by a living person or animal in a vehicle, the software comprising programmed instructions, which, when executed by a processor, cause the processor to:

detect if an engine of the vehicle is off and to detect, via a vehicle door sensor, if all doors of the vehicle are closed, if the doors are closed, monitor changes in carbon dioxide (CO2) levels in the vehicle via a CO2 sensor to thereby detect the presence of a breathing person or animal in the vehicle;

after the presence of a breathing person or animal in the vehicle has been detected by the CO2 sensor, monitor a temperature (T) inside the vehicle via a temperature sensor; and if T reaches or exceeds a preset value (T1), activate the vehicle's air conditioning unit and/or lower at least one of the vehicle's windows.

* * * * *